(12) United States Patent
Irshad et al.

(10) Patent No.: US 11,988,069 B2
(45) Date of Patent: May 21, 2024

(54) PREDICTIVE PRESSURE PROTECTION SYSTEM

(71) Applicant: Saudi Arabian Oil Company, Dhahran (SA)

(72) Inventors: Ahmer Irshad, Dhahran (SA); Wael F. Blaies, Dhahran (SA); Mahdi A. Al-Dajani, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 889 days.

(21) Appl. No.: 17/071,720

(22) Filed: Oct. 15, 2020

(65) Prior Publication Data
US 2021/0381341 A1 Dec. 9, 2021

Related U.S. Application Data

(60) Provisional application No. 63/036,077, filed on Jun. 8, 2020.

(51) Int. Cl.
*E21B 44/06* (2006.01)
*E21B 34/16* (2006.01)
*E21B 35/00* (2006.01)
*F23D 14/82* (2006.01)

(52) U.S. Cl.
CPC .............. *E21B 34/16* (2013.01); *E21B 35/00* (2013.01); *E21B 44/06* (2013.01); *F23D 14/825* (2013.01); *F23D 2900/00* (2013.01)

(58) Field of Classification Search
CPC .......... E21B 34/16; E21B 35/00; E21B 44/06; F23D 14/825; F23D 2900/00
See application file for complete search history.

(56) References Cited

U.S. PATENT DOCUMENTS

| 7,039,502 B2 | 5/2006 | Berwanger et al. |
| 9,720,422 B2 | 8/2017 | Pantellides et al. |
| 10,303,815 B2 | 5/2019 | Aylott et al. |

(Continued)

FOREIGN PATENT DOCUMENTS

| EP | 2802948 | 11/2014 |
| WO | WO 2009087371 | 7/2009 |
| WO | WO 2014149528 | 9/2014 |

OTHER PUBLICATIONS

PCT International Search Report and Written Opinion in International Appln. No. PCT/US2021/036148, dated Sep. 17, 2021.

(Continued)

*Primary Examiner* — Kibrom K Gebresilassie
(74) *Attorney, Agent, or Firm* — Fish & Richardson P.C.

(57) ABSTRACT

Systems and methods include a computer-implemented method for providing a predictive pressure protection system. Flare sources, performance limits, and relationships between control valves and relief valves are established. A flare simulator is generated using piping isometric drawings. An emergency event is monitored, and information for the emergency event is filtered based on a control valve limit breach. Event start and finish time periods are divided into cases representing smaller time frames. Source max loads are determined for each case, and each case is run through the flare simulator. Flare/relief valve performance indicators are determined based on the source max loads after running each case.

20 Claims, 17 Drawing Sheets

(56) References Cited

U.S. PATENT DOCUMENTS

| | | |
|---|---|---|
| 2006/0225507 A1 | 10/2006 | Paulson |
| 2006/0248921 A1* | 11/2006 | Hosford ............... B01D 53/047 62/611 |
| 2014/0266740 A1* | 9/2014 | Fernandes .......... G05B 23/0224 340/577 |
| 2016/0076334 A1* | 3/2016 | Maher .................... E21B 47/06 137/12 |
| 2018/0023360 A1 | 1/2018 | Flanders et al. |

OTHER PUBLICATIONS

Aspentech, "Aspen Flare System Analyzer," Aspen Technology, Inc., Version No. V8.0, Dec. 2012, 81 pages.

* cited by examiner

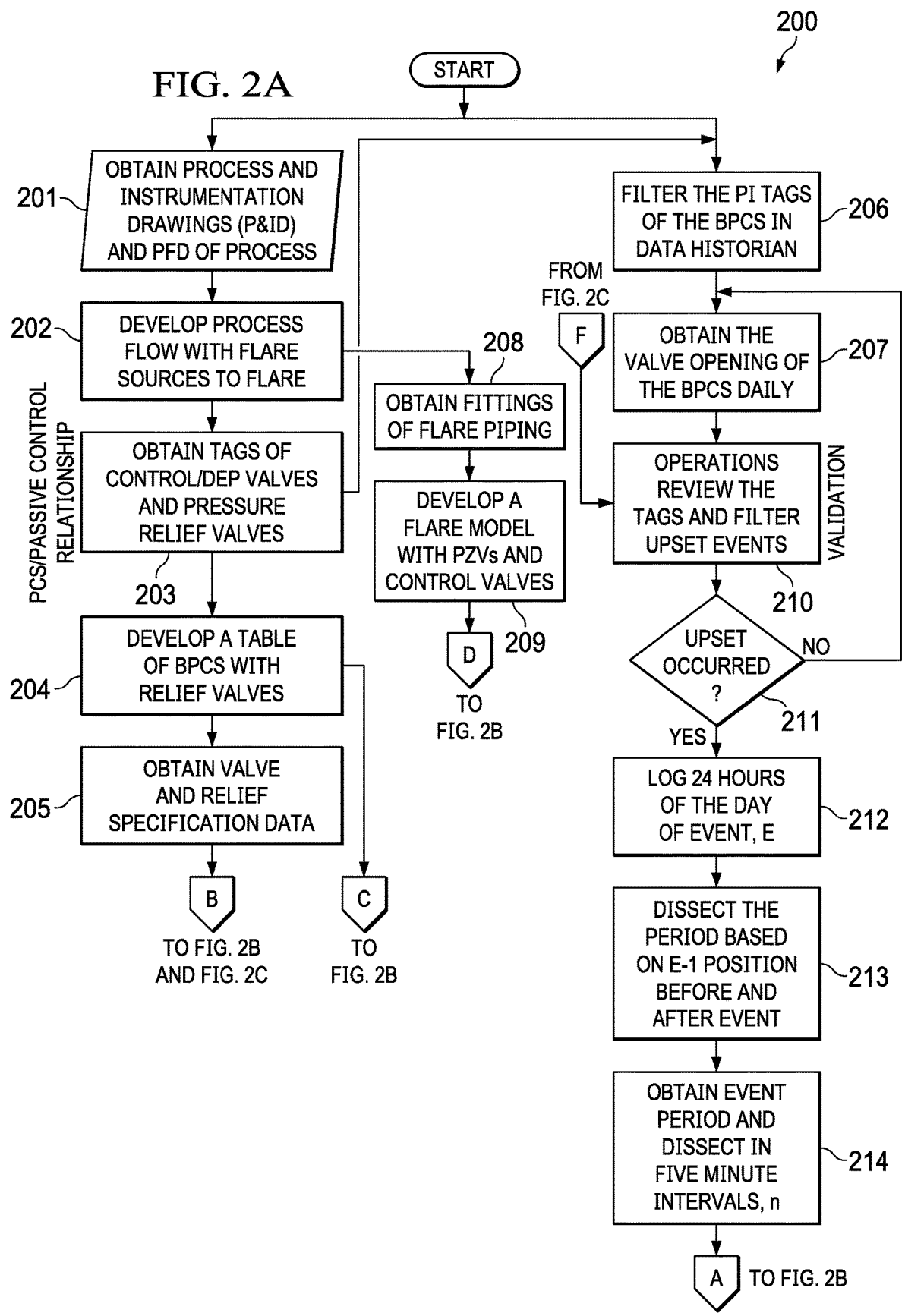

600

| Welcome: Username |
|---|
| Home  System Administration ▶  Site Administrator ▶  Reports ▶  Help |
| Date From: [MM/DD/YYYY] |
| Date To: [MM/DD/YYYY] |

| DateTime | DeviceID | Comments |
|---|---|---|
| MM/DD/YYYY<br>12:00:00 AM | Device ID 1 | Non-controllable flaring due to power failure from SEC lines |

FIG. 6

| BPCS/Passive Relief | | |
|---|---|---|
| | Relational Database | |
| D-1 Outlet | PCV-32 | PZV-3210-1 |
| | | PZV-3210-2 |
| | | PZV-3210-3 (SPARE) |
| D-2 Outlet | PCV-14 | PZV-3011-1 |
| | PCV-30 | PZV-3011-2 |
| | | PZV-3011-3 |
| | | PZV-3011-4 (SPARE) |
| HP Compressor valve inlet PVC-30 | | D-1 PRVs |
| D-3 Outlet | PCV-4003 | PZV-4001-1 |
| | | PZV-4001-2 (SPARE) |

FIG. 8

| Case | PZV-3210-1 Mass Flow lb/hr | PZV-3210-2 Mass Flow lb/hr | PZV-3011-1 Mass Flow lb/hr | PZV-4001-1 Mass Flow lb/hr | PZV-3210-1 Back Pressure psig | PZV-3210-2 Back Pressure psig | PZV-3011-1 Back Pressure psig | PZV-4001-1 Back Pressure psig |
|---|---|---|---|---|---|---|---|---|
| 1 | 234913 | 234913 | 2253 | 16566 | 29.0 | 28.7 | 9.5 | 10.2 |
| 2 | 184756 | 184756 | 13519 | 0 | 29.1 | 28.5 | 7.0 | 7.3 |
| 3 | 188724 | 188724 | 4506 | 39758 | 29.4 | 28.8 | 7.8 | 8.6 |
| 4 | 123171 | 123171 | 4506 | 99395 | 29.6 | 28.9 | 6.2 | 10.6 |
|  | 731564 | 731564 | 24786 | 155718 |  |  |  |  |

FIG. 11

PREDICTIVE PRESSURE PROTECTION SYSTEM

CROSS-REFERENCE TO RELATED APPLICATIONS

This application is a conversion of Provisional Application No. 63/036,077, filed on Jun. 8, 2020, and is hereby incorporated by reference in its entirety.

BACKGROUND

The present disclosure applies to predictive pressure protection systems used, for example, for petroleum facilities.

A commonly-held concept that basic process control layer and a passive layer for equipment protection are "independent" is a well-known practiced doctrine in the industry. This concept teaches away from the view that information from basic process control layer can form an important process input to the passive layer in predicting the performance of the passive layer. Therefore, for a typical process engineer, a need does not arise to draw a relation between the two layers. Also, although a typical plant emergency lasts only for a few hours, dynamic load modelling with actual process equipment changes affecting the flare piping flow hydraulics is a cumbersome exercise. A need arises for a systematic and organized means to capture and model the process equipment dynamics interacting with the disposal system. Thereby, the ability of a process safety system to accommodate the required relief can be predicted.

SUMMARY

The present disclosure describes techniques that can be used to provide a predictive pressure protection system. The system can be implemented as a predictive application developed from data procurement principals of a corporate flare monitoring system, for example. The techniques can solve complex dynamic modeling obstacles by sectionalizing an emergency event, dividing the event into parts, and then modelling each part through a hydraulic model to obtain a profile of the what-if impact on the passive protection layer. The predictive tool can include safety aspects (predicting strengths and weaknesses of processes) and economic aspects (identifying over capacity for future expansion opportunities). The predictive tool can be used for petroleum facilities, for example.

In some implementations, a computer-implemented method includes the following. Flare sources, performance limits, and relationships between control valves and relief valves are established. A flare simulator is generated using piping isometric drawings. An emergency event is monitored, and information for the emergency event is filtered based on a control valve limit breach. Event start and finish time periods are divided into cases representing smaller time frames. Source max loads are determined for each case, and each case is run through the flare simulator. Flare/relief valve performance indicators are determined based on the source max loads after running each case.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, techniques can be used to identify weak points in passive flare and relief systems which may fail in an emergency release. Second, the techniques can be used to identify flare and relief system overcapacity that may provide an opportunity for facility throughput/feed increase. Third, techniques can be used to determine whether a passive layer of protection is adequate, for example, whether a passive layer can be predicted based on actual events. Fourth, links can be identified between active (basic process control) and passive (flare and relief) layers. For example, techniques can be used to connect the two layers by transferring rates from a Basic Process Control System (BPCS) to a passive system. Fifth, events can be modeled using loads in time slices. Sixth, prototypes can be developed by applying the framework on actual cases to prove a practical implementation of ideas. Seventh, digitalization concepts can be developed per flare evergreening and data management systems. Eighth, visual dashboards and key process indicators (KPIs) can be provided to display information related to the predictive pressure protection system. Ninth, a flare digitized system can be integrated with a plant data archiver. Tenth, maximum flow can be used in valve characteristic equations for efficient estimation of BPCS rates. Eleventh, entire flare networks can be modeled to account for breaches occurring in inactive parts of the flare system. Twelfth, processes can implicitly account for equipment interactions and can use actual releases to predict behavior of relief systems.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 2A-2C are flow diagrams collectively showing an example of a workflow for a predictive pressure protection system, according to some implementations of the present disclosure.

FIG. 6 is a screen print of an example of a user interface with operational comments that accompanies the graph 500, according to some implementations of the present disclosure.

FIG. 8 is a screen shot of an example of a BPCS/passive relief table, according to some implementations of the present disclosure.

FIG. 11 is a screen print of an example of a table including data for automated hydraulic model run cases with results, according to some implementations of the present disclosure.

Like reference numbers and designations in the various drawings indicate like elements.

DETAILED DESCRIPTION

The following detailed description describes techniques for providing predictive pressure protection systems. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Predictive tools used to validate events to model passive layers can be based on basic process control/passive layer link. Numerous hydraulic cases can be run for an entire emergency event after identifying and dividing the event into shorter time periods. The techniques can ensure that the relief valves and piping are fit for the purpose. If the system cannot handle a release, then the sources can be flagged. Subsequently, in future de-bottlenecks of the plant, a system that requires an upgrade can also be flagged.

Figure 1:
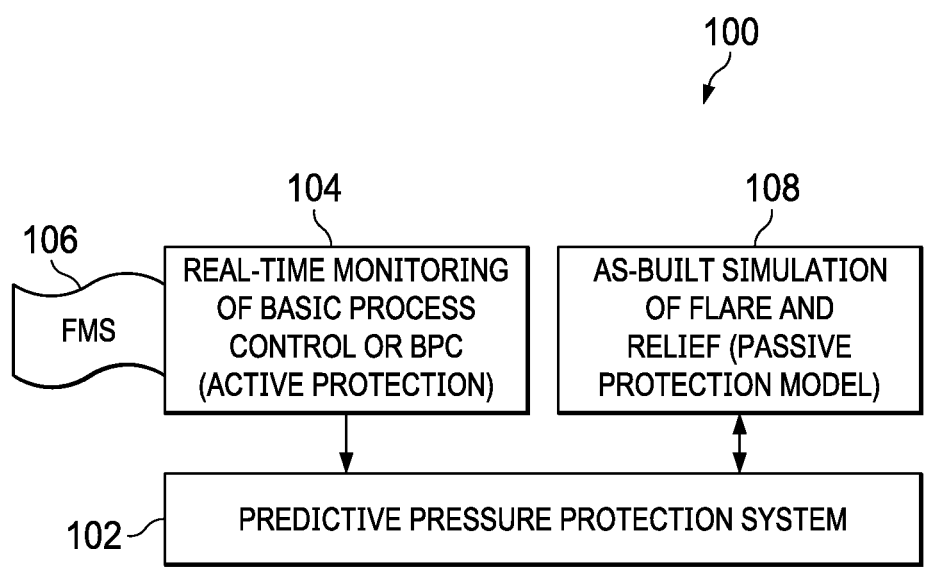
FIG. 1 is a block diagram showing an example, of an architecture that includes a predictive pressure protection system.

FIG. 1 is a block diagram showing an example, of an architecture 100 that includes a predictive pressure protection system (or system 102). The system 102 can log upset events (for example, power failures and cooling water loss). The events can be first registered through real-time monitoring 104 (or tracking) of releases from process equipment to the flare against a digitized flare network of relief valves and piping. For example, the term real-time can correspond to events that occur within a specified period of time, such as within minutes or seconds. The real-time monitoring 104 can use a Flare Monitoring System (FMS) 106, for example. As a result, the system 102 can aid in predicting process safety deficiencies, minimizing the chances of overdesigning a plant's flare network. The system 102 can use an as-built simulation of flare and relief (or passive protection) model 108.

The system 102 can dissect a time period of a flagged event during which each flare source (for example, a set of control valves) releases fluid to the flare piping. Each source has one or more corresponding relief valves in a digitized flare model. As such, each source release is allocated to the relief valve(s). The time period can be divided into N number of discrete points. For an actual flaring event, the flare model is run for N number of times to develop actual performance factors (for example, pressure, temperature, and velocity) for each relief valve. The actual performance factors can be compared against the relief valve and flare design parameters (for example, mechanical limit, back pressure limit, and vibration). Then, a design integrity (indicating under-design or overdesign) report can be developed. An event logger can append and cache the actual performance with past results to enhance an integrity profile in a graphical format. This information can be used to generate predictions of the robustness of relief valves/flares against the risk of catastrophic failure. Consequently, an operations engineer can fix a potential deficiency (categorized as a safety impact) or increase plant feed (categorized as an economic impact) in response to the predicted performance of relief valves/flares from actual events.

The techniques described in the present disclosure can be used to predict the ability of a flare and relief system to handle an emergency release. Based on a predetermined set of metrics, the operator can be alerted if the capacity may be breached. Also, any overdesign margin can be identified and used in opportunities to increase and process additional feed through the plant in the future.

To be able to generate predictions, actual releases to the flare system typically occur through pressure control valves (also known as basic process control system). The releases can be recorded in a data historian. The actual data can be imported through relief valves in a simulator, for example. Multiple simulations can be run to develop predictions for how relief devices may have reacted if the releases were to occur through relief valves.

Figure 2B:
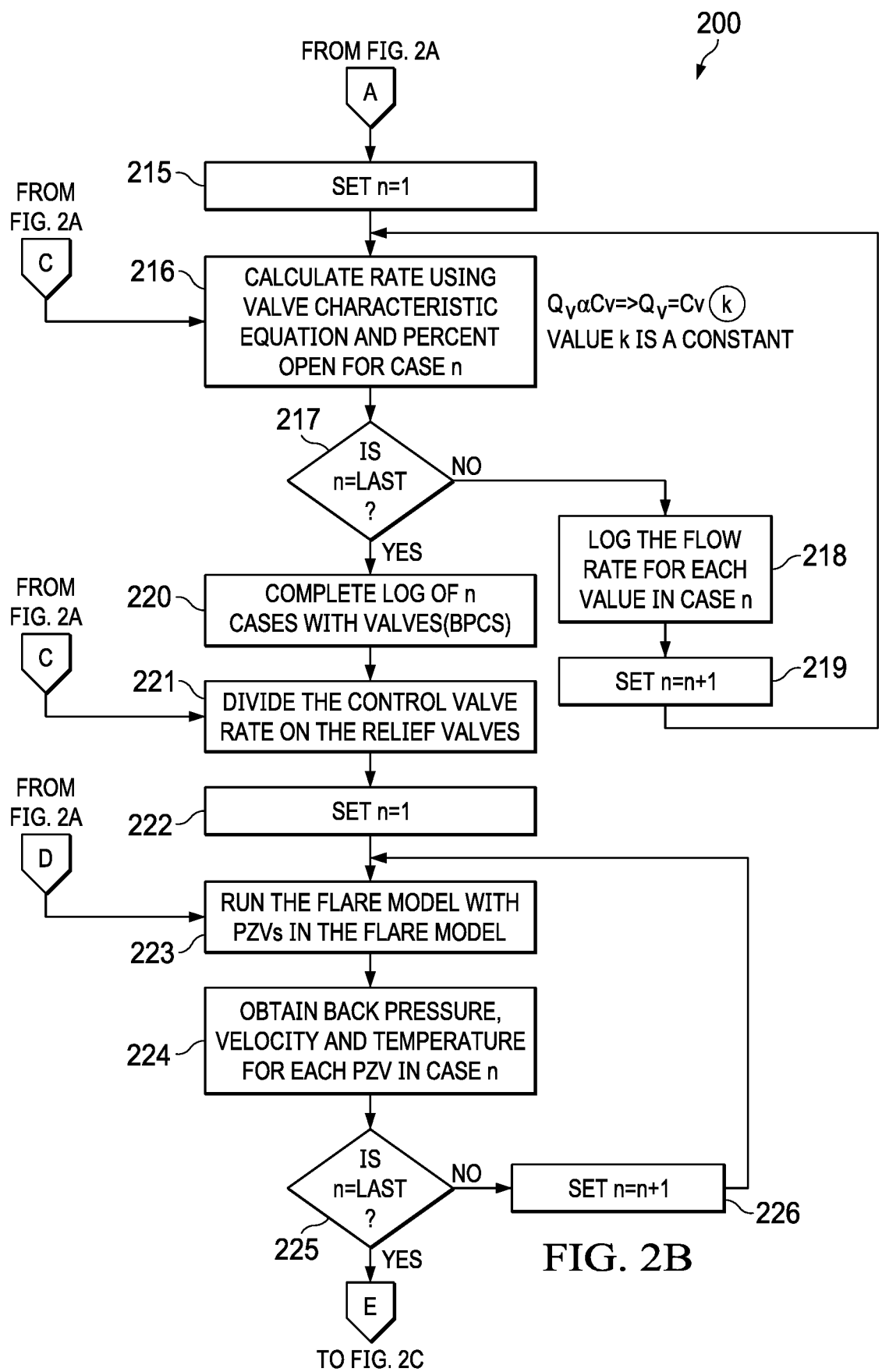
Figure 2C:
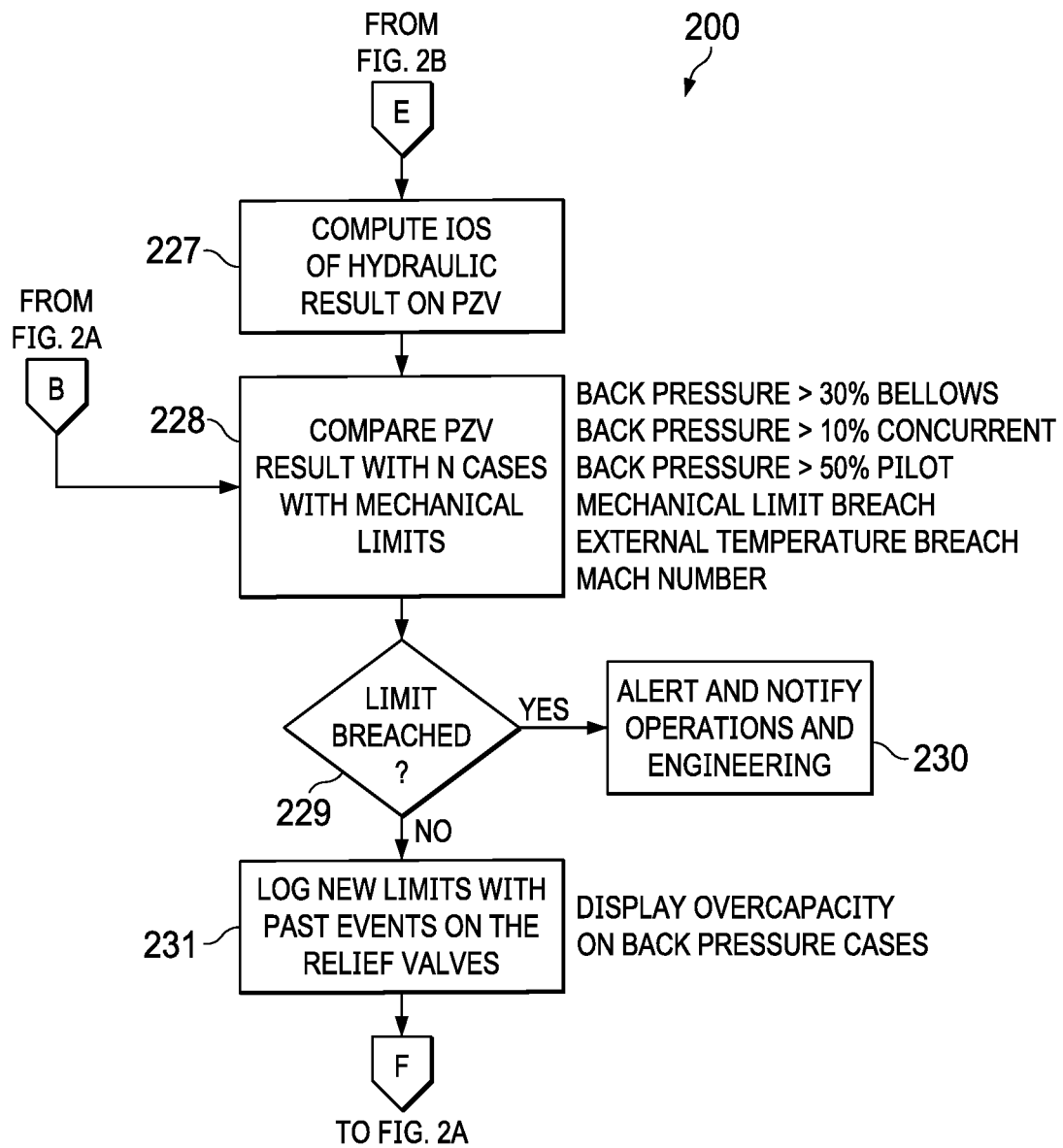

FIGS. 2A-2C are flow diagrams collectively showing an example of a workflow 200 for a predictive pressure protection system, according to some implementations of the present disclosure. Process and Instrumentation Drawings (P&ID) are typically used to develop an overall process schematic. At 201, the P&ID and process flow diagram (PFD) are obtained. The process schematic should include the major process equipment that are tied to flare. The sources to the flare, specifically, include control valves and relief valves that are depicted on the schematic. At 202, process flows that include flare sources to flares are developed. At 203, identification tags of the control valves and relief valves are obtained. Pressure control valves are a part of basic process control for the process equipment in case of an emergency.

Detailed piping isometric or field mechanical walkdown of piping can be used to develop a flare piping network sketch, at 208. A flare piping model can be constructed using a commercial software at 209.

Relief valves that form a passive control can be activated when basic process control is deficient. A relationship table between the pressure control valve and the relief valves is developed from the P&IDs at 204. Specification sheets of control valves and relief valves are obtained at 205. Characteristics of control valves including valve normal operating flow coefficients and installed flow coefficients can be included in the specification sheet. Relief valve types and mechanical limits, including back pressure limits, can be obtained from the relief valve specification sheet.

From 203, the control valve tags are filtered in a data historian. Specifically, the valve opening tags which, for instance, depict the position of valves are selected. The plant operators monitor the real-time valve openings on a daily basis, as table depicting spurious or actual event can be used to filter the actual emergency events at 207. The filter is initially provided by abnormal opening of the valve with operations, providing a feedback validating the actual event at 208. When an event, such as a power failure or loss of plant utilities (for example, instrument air) occurs in a given period at 211, a time period from the start, throughout, and an end of the incident is dissected at 212. The valves' opening and closing positions within a 24-hour period are used to dissect the emergency period at 213. The period is further divided into time increments (for example, 5 minute increments) to obtain the percent opening of the valves at 214. A counter is set from the first point, followed by time increments until the last point at 215 and 217. During the counter, the valve position is converted into the instantaneous flow rate by using standard performance equations for control valves based on the data from the valve specification sheet at 216. The cases representing each point in the incremented time are logged with flow rates corresponding to each control valve at 220.

The relational table between the control valve and the relief valve developed in at 204 is used to distribute the control valve rate to relief valve(s) at 221. As a result, the flow rate for each relief valve is specified in each case. From the flare hydraulic model at 205, each of the cases is run until all the cases in a given time increment are solved at 223 and results of the relief device/flare (including back pressure, velocity, and temperature) are stored in a table at 227. A graphical representation of relief valve design limits (for example, back pressure, rating, and temperature) are compared against the predicted performance at 228. A notification is sent through an alert system to plant operations and engineering to take an action for rectifying the situation at 230. The predicted performance is logged with the previously recorded results and displayed to show the disposition of the relief system at 231. Any overcapacity with satisfactory performance showing the relief valve parameters within the design limits can be logged with a notification to the plant. The events can be continuously monitored through the validation at 210.

In order to study the effectiveness of the techniques of the present disclosure, an actual emergency release was used to develop a prediction profile. A company's plants were scanned for emergency releases over a period of 12 months. Events from one facility were identified. Techniques of the present disclosure and steps of the workflow were applied with an apparatus for analyzing the under or overcapacity of the system. FIGS. 3-12 correspond to actual event showing how the techniques of the present disclosure can be used to predict the strength of a passive relief system from a BPCS.

Figure 3:
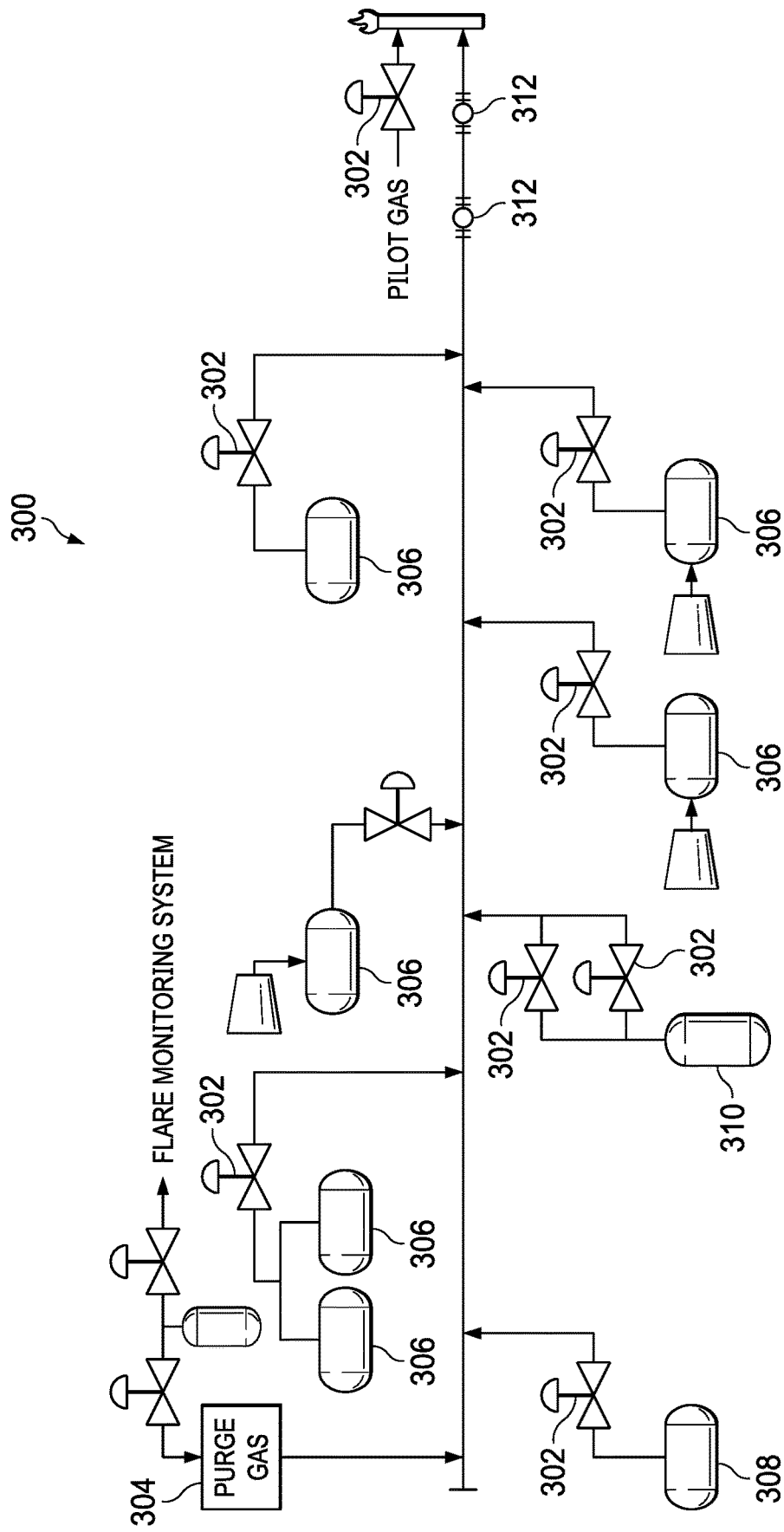
FIG. 3 is a block diagram showing an example of a Basic Process Control System (BPCS), according to some implementations of the present disclosure.

FIG. 3 is a block diagram showing an example of a Basic Process Control System (BPCS) 300, according to some implementations of the present disclosure. The BPCS 300 can be used for a flare monitoring system for a gas and oil separation plant (GOSP), for example. Equipment include pressure control valves (PCVs) 302, a purge gas 304, high pressure (HP) production traps (HPPTs) 306, a low pressure production traps (LPPT) 308, a degasser 310, and flare meter 312.

The block diagram presented in FIG. 3 can serve as a process connectivity drawing. For example, the block diagram shows relationships between the protected equipment and associated protective equipment (for example, the Basic Process Control System). The relationship between the protected equipment and the BPCS is required to monitor instantaneous flow release from the equipment during an emergency. Equipment in the block diagram generally includes protected equipment (for example, pressure vessels, compressors, and piping sections), protective equipment (for example, pressure control valves, flow control valves, and flares), and measurement equipment (for example, flowmeters).

Figure 4:
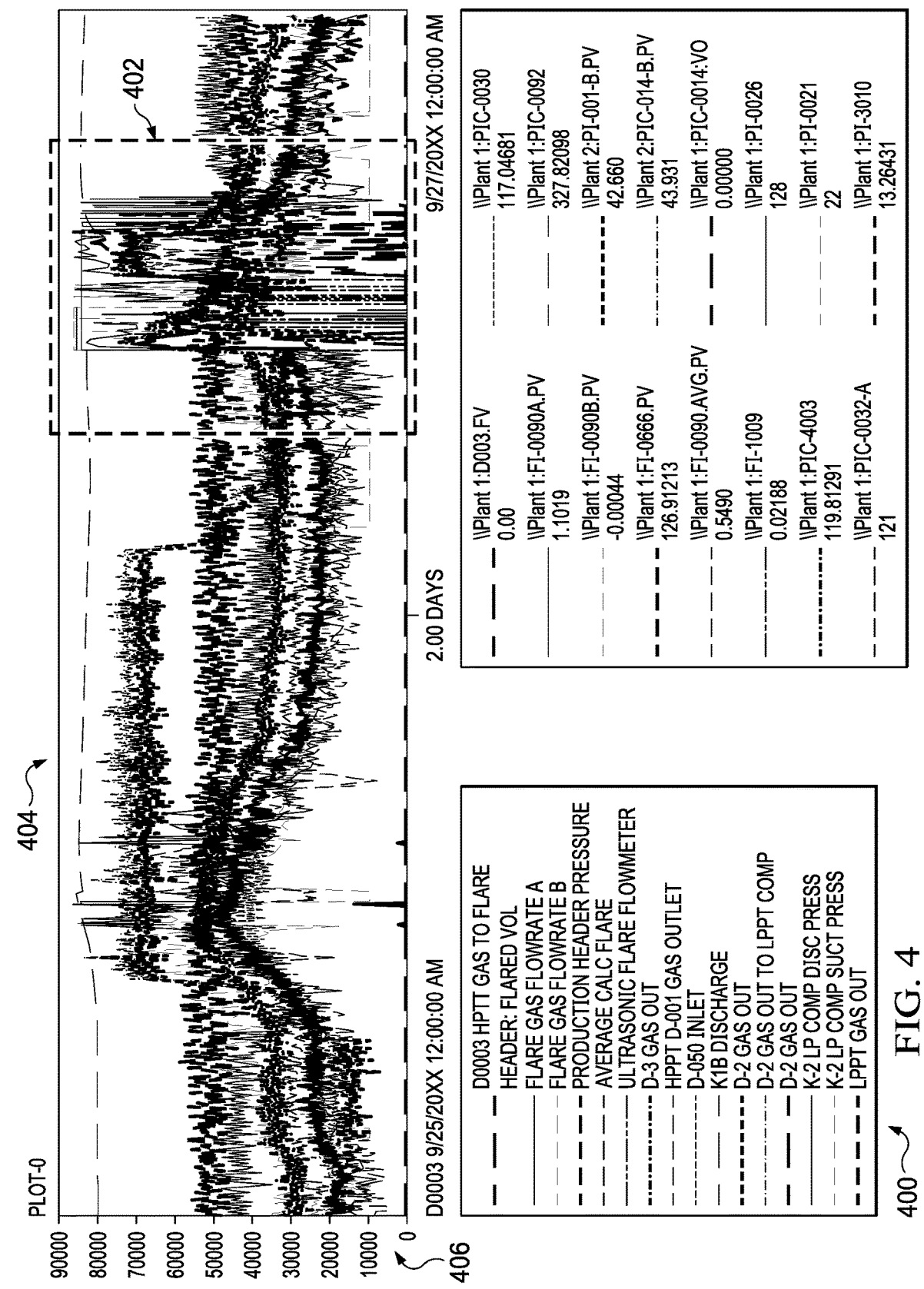
FIG. 4 is a graph showing an example of an abnormal event captured by real-time monitoring of a BPCS, according to some implementations of the present disclosure.

FIG. 4 is a graph 400 showing an example of an abnormal event 402 captured by real-time monitoring of a BPCS, according to some implementations of the present disclosure. For example, the graph 400 shows the abnormal event 402 taking place, as BPCS activation is identified. Plots on the graph 400 are relay time 404 and magnitude 406. The graph 400 includes plots for process equipment (for example, High Pressure Production Trap or HPPT) gas outlet to flare header, process equipment pressures, and flare flowmeter reading.

Figure 5:
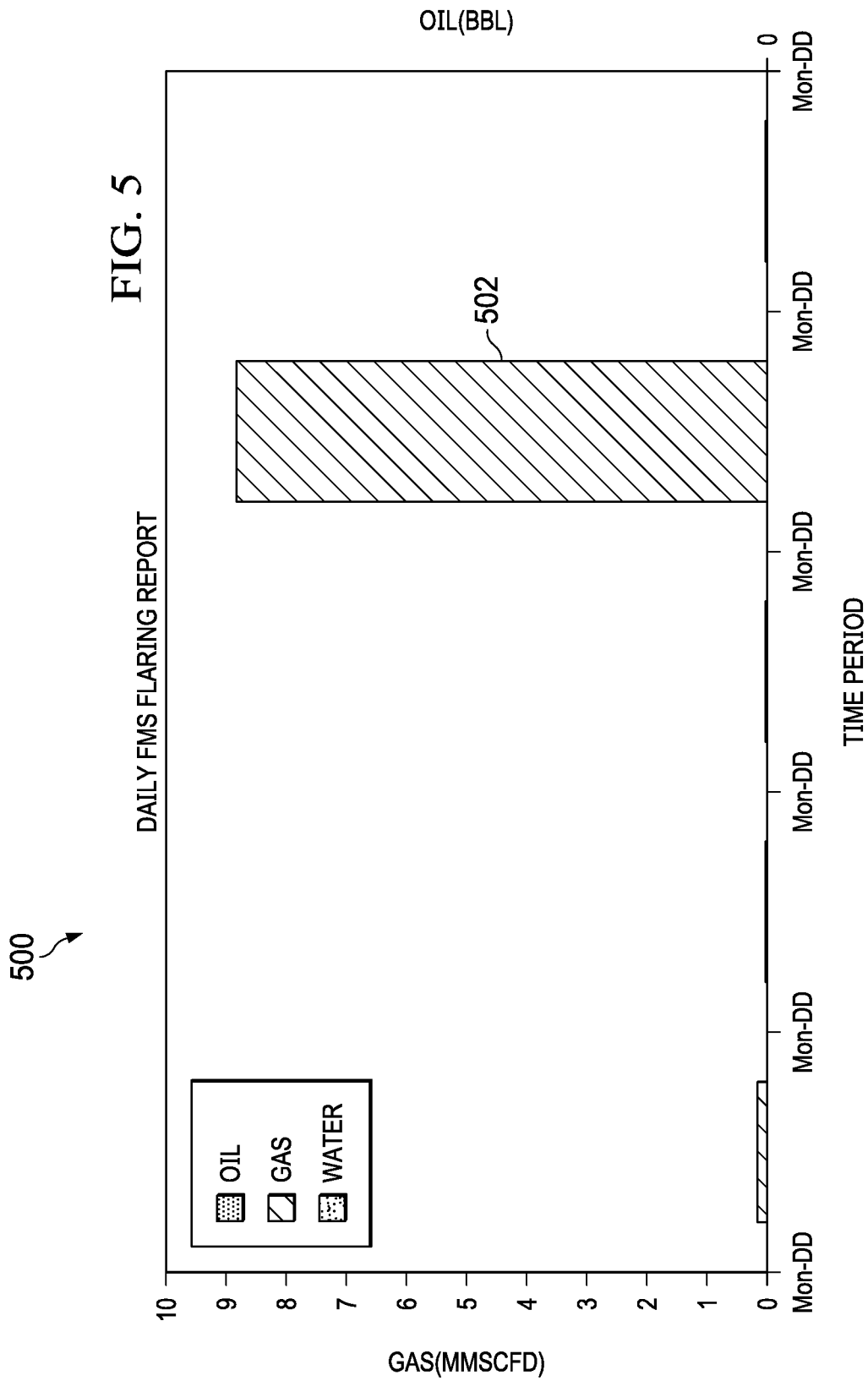
FIG. 5 is a graph associated with an example of a daily Flare Monitoring System (FMS) flaring report, according to some implementations of the present disclosure.

FIG. 5 is a graph 500 associated with an example of a daily Flare Management Strategy (FMS) flaring report, according to some implementations of the present disclosure. The graph 500 includes bars using amounts of gas and water over time. A bar 502 indicates an event validated as an emergency.

FIG. 6 is a screen print of an example of a user interface 600 with operational comments that accompanies the graph 500, according to some implementations of the present disclosure.

Figure 7:
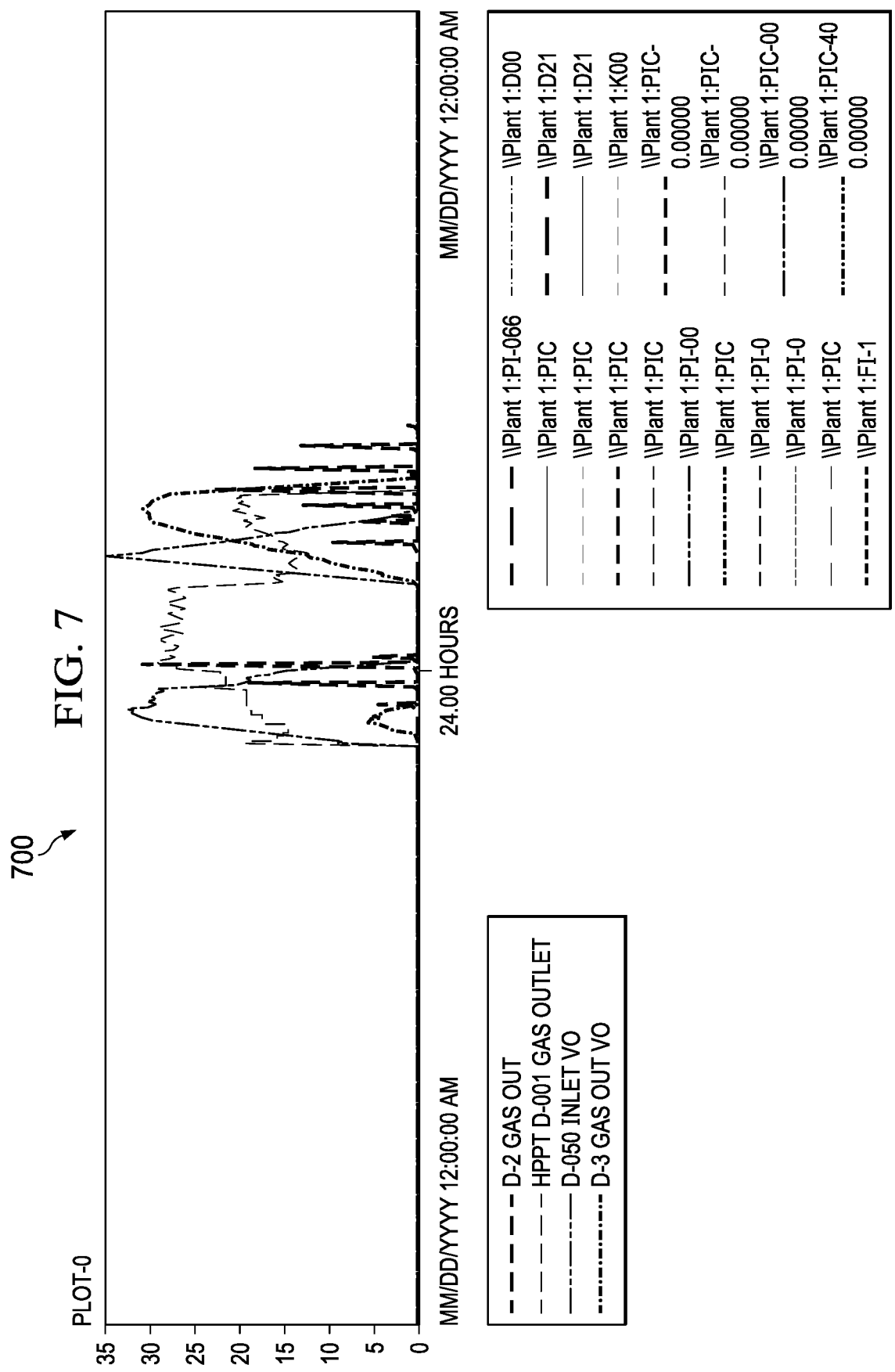
FIG. 7 is a graph showing an example of gas out plots, according to some implementations of the present disclosure.

FIG. 7 is a graph showing an example of gas out plots 700, according to some implementations of the present disclosure. The gas out plots 700 correspond to a sectionalized event period from a BPCS activation start and end.

FIG. 8 is a screen shot of an example of a BPCS/passive relief table 800, according to some implementations of the present disclosure. The table 800 includes relationship between process equipment, control valves and relief valves.

Figure 9:
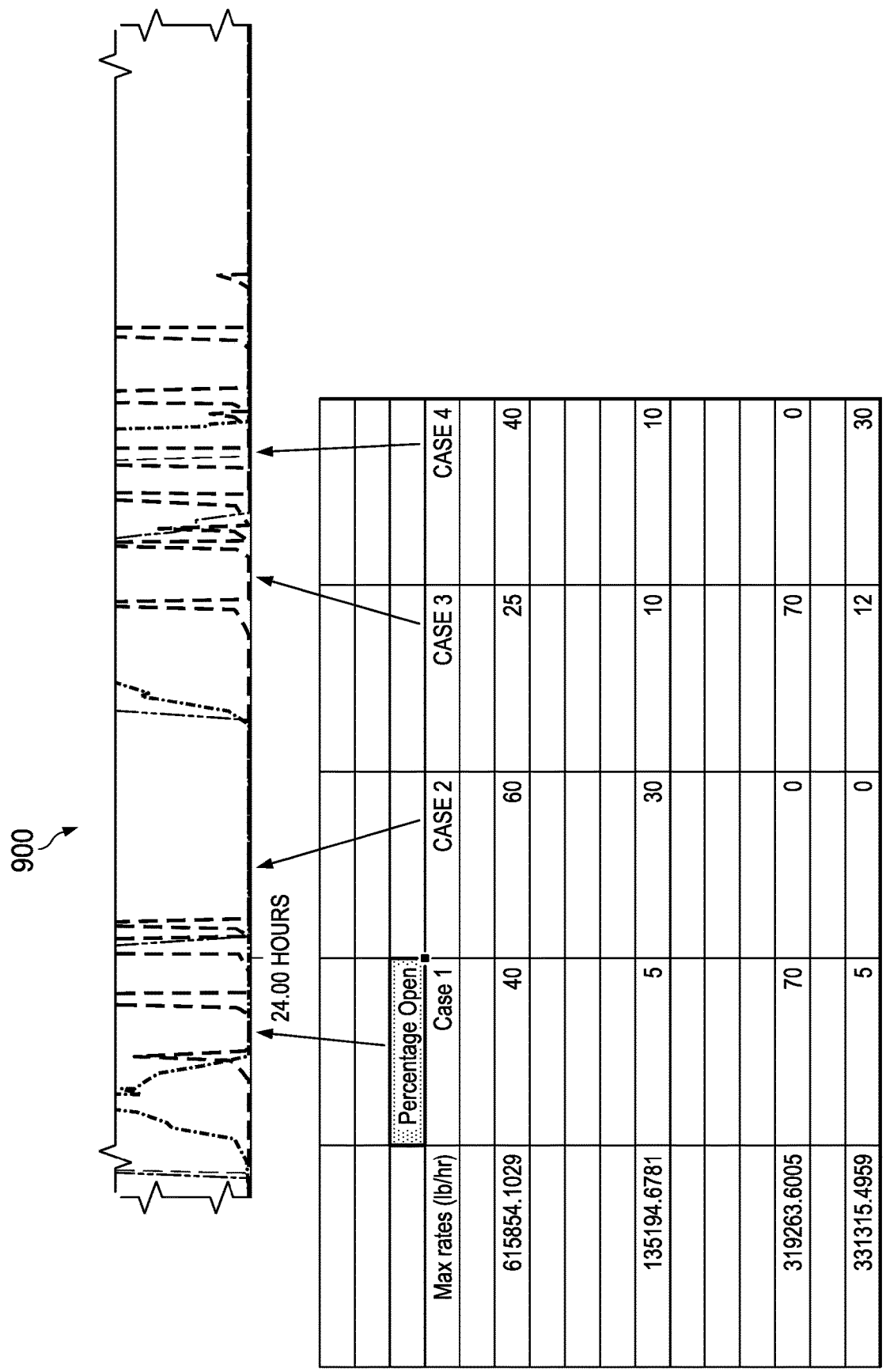
FIG. 9 is a screen shot showing example of discrete time stamps identified with a BPCS valve opening, according to some implementations of the present disclosure.

FIG. 9 is a screen shot showing example of discrete time stamps 900 identified with a BPCS valve opening, according to some implementations of the present disclosure. The discrete time stamps 900 correspond to cases with values in the table tied to specific timestamps. The valve opening positions derive values for the prediction profiler.

Figure 10:
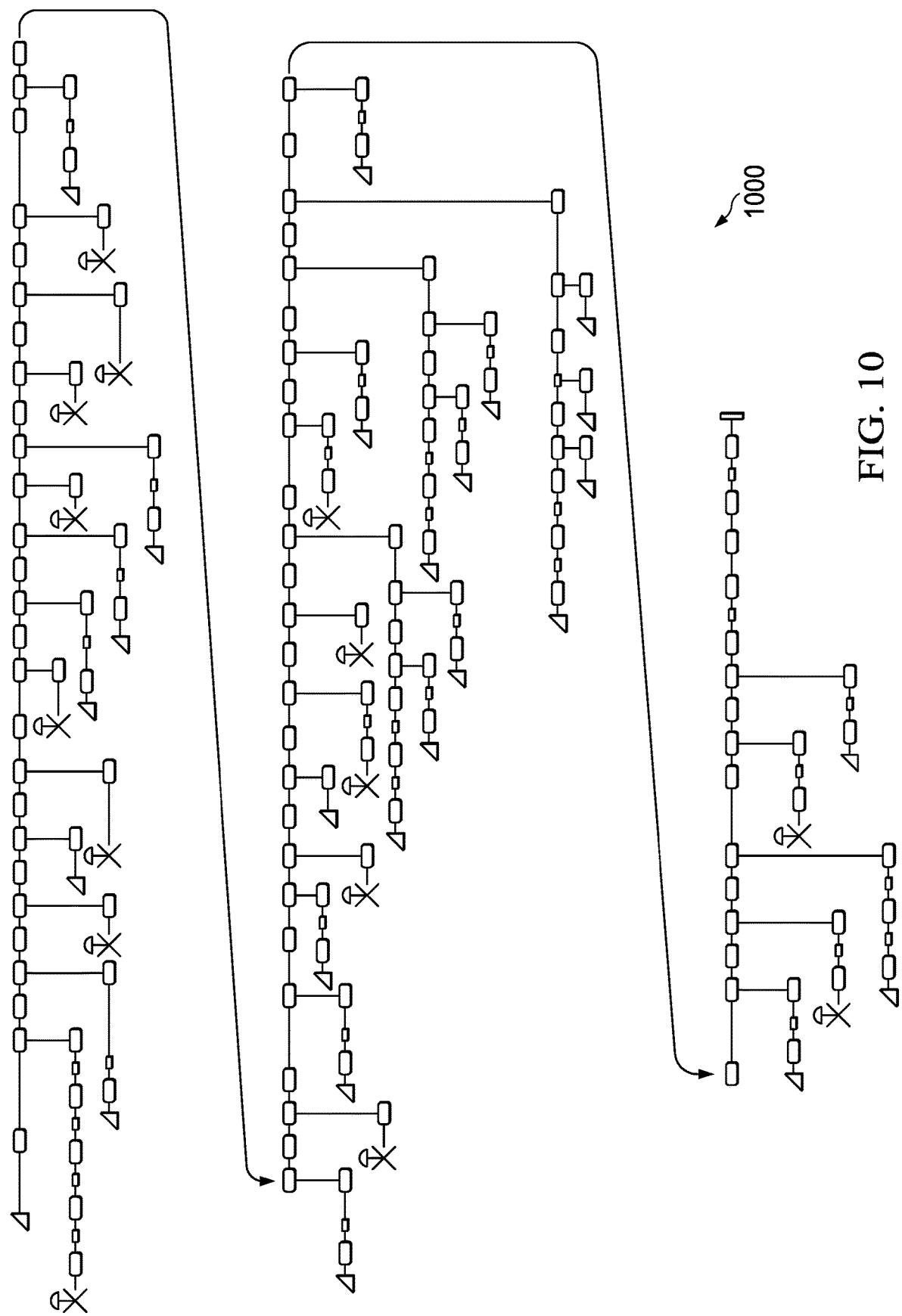
FIG. 10 is a block diagram of an example of a hydraulic model with passive protection layer developed for predicting profile, according to some implementations of the present disclosure.

FIG. 10 is a block diagram of an example of a hydraulic model 1000 with passive protection layer developed for predicting hydraulic flow profile, according to some implementations of the present disclosure. Relief valves serve as protective equipment and belong to the Passive Control System.

FIG. 11 is a screen print of an example of a table 1100 including data for automated hydraulic model run cases with results, according to some implementations of the present disclosure. Values that are output from a data historian can be transferred as input to the simulator. Data in the highlighted cells 1102 can be calculated from the data historian using a new pressure control valve performance equation (For example, based on a maximum value in each dissected time period). If an actual flow control valve with a flow indicator is present, then a direct reading can be taken from the data historian.

Figure 12:
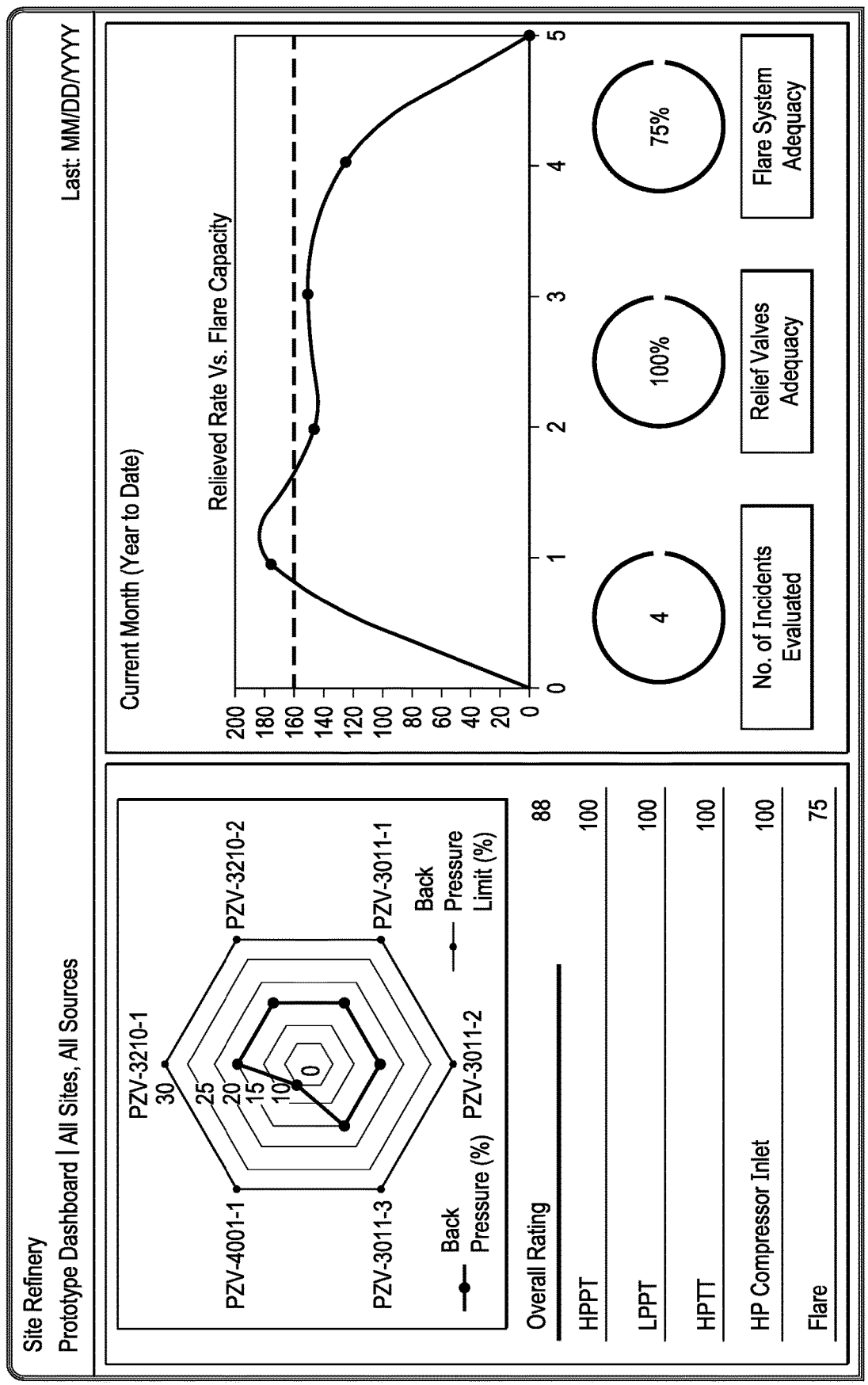
FIG. 12 is a screen print of an example of a dashboard displaying results compared with a threshold, capacity, and strength indicator, according to some implementations of the present disclosure.

FIG. 12 is a screen print of an example of a dashboard 1200 displaying results compared with a threshold, capacity, and strength indicator, according to some implementations of the present disclosure. The dashboard 1200 can include UI elements such as simulator input file name and location, event date with start and end time, and protected equipment (for example, HPPT, LPPT, HPTT, and HP compressor tags). The UI elements can also include protective equipment, including relief valve tags (for example, PZV-3210s, PZV-3011s, PZV-4001) and flare tags. The UI elements can also include a number of cases evaluated (and a number of incidents evaluated) and relief valve performance information, including flow capacity of relief valve (input origin from data historian or can be over-ridden by user), flow capacity design limit of relief valve, backpressure of relief valves for each case (simulated), back pressure design limit of relief valves, and a number of relief valves satisfying the design criterion. The UI elements can also include flare system performance information, including flare flow design limit and actual flow (aggregated from data historian), flare Mach number design limit and actual (simulated), and a number of cases where the flare limit is exceeded. The UI elements can also include flare system piping information alerts in case of a breach, including an actual Mach number (simulated) and a design limit (set in the simulator).

Figure 13:
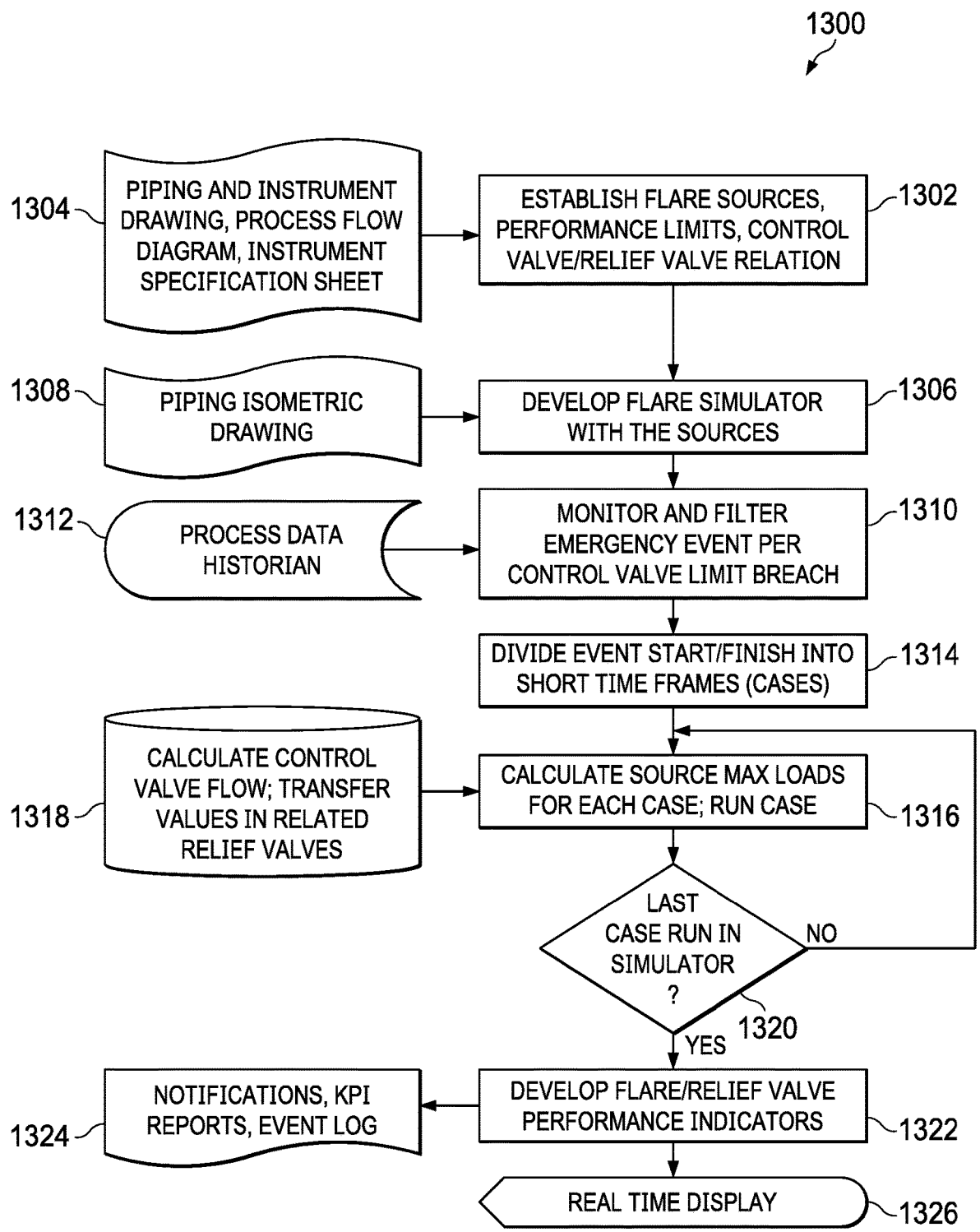
FIG. 13 is a flowchart of an example of a workflow for a predictive pressure protection system, according to some implementations of the present disclosure.

FIG. 13 is a flowchart of an example of a workflow 1300 for a predictive pressure protection system, according to some implementations of the present disclosure. The workflow 1300 can serve as a simplified version of the workflow 200, for example.

At 1302, flare sources, performance limits, control valve/relief valve relation are established. The information can be established, for example, using one or more of piping and instrument drawings, process flow diagrams, and instrument specification sheets 1304.

At 1306, flare simulator is developed using the sources, for example using piping isometric drawing 1308.

At 1310, an emergency event is monitored and filtered with respect to control valve limit breach. The monitoring and filtering can use a process data historian 1312, for example.

At 1314, event start/finish time periods are divided into short time frames (or cases).

At 1316, source max loads are calculated for each case, and each case is run. For example, the calculation can use a calculate control valve flow and transfer values in related relief valves 1318.

At 1320, a determination is made whether the case is the last case run in simulator.

At 1322, if the last case has been run in the simulator, flare/relief valve performance indicators are developed at 1320. Outputs can include, for example, notifications, key process indicator (KPI) reports, and an event log 1324. A real-time display 1326 can be created.

Figure 14:
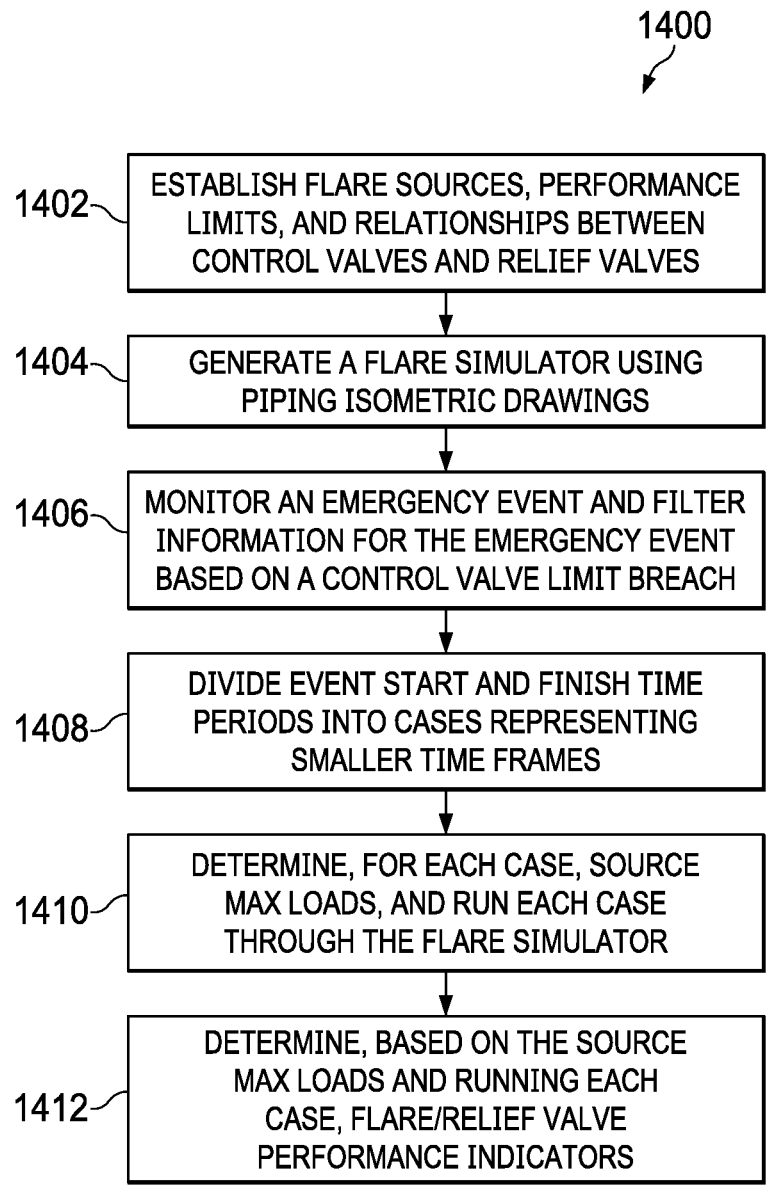
FIG. 14 is a flowchart of an example of a workflow for a predictive pressure protection system, according to some implementations of the present disclosure.

FIG. 14 is a flowchart of an example of a method 1400 for a predictive pressure protection system, according to some implementations of the present disclosure. For clarity of presentation, the description that follows generally describes method 1400 in the context of the other figures in this description. However, it will be understood that method 1400 can be performed, for example, by any suitable system, environment, software, and hardware, or a combination of systems, environments, software, and hardware, as appropriate. In some implementations, various steps of method 1400 can be run in parallel, in combination, in loops, or in any order.

At 1402, flare sources, performance limits, and relationships between control valves and relief valves are established. As an example, establishing the flare sources can be based on one or more of piping and instrument drawings, process flow diagrams, and instrument specification sheets. From 1402, method 1400 proceeds to 1404.

At 1404, a flare simulator is generated using piping isometric drawings. From 1404, method 1400 proceeds to 1406.

At 1406, an emergency event is monitored, and information for the emergency event is filtered based on a control valve limit breach. For example, the monitoring and filtering can use a process data historian. In some implementations, method 1400 further includes detecting the emergency event based on deviations of a source from preset limits, for example, determining that equipment readings are outside a pre-determined range associated with a non-emergency state. From 1406, method 1400 proceeds to 1408.

At 1408, event start and finish time periods are divided into cases representing smaller time frames. From 1408, method 1400 proceeds to 1410.

At 1410, source max loads are determined for each case, and each case is run through the flare simulator. For example, determining the source max loads for each case can include calculating control valve flow and transferring values in related relief valves. From 1410, method 1400 proceeds to 1412.

At 1412, flare/relief valve performance indicators are determined based on the source max loads and running each case. For example, the flare/relief valve performance indicators can include notifications, key process indicator (KPI) reports, and event logs. After 1412, method 1400 can stop.

In some implementations, method 1400 further includes creating a real-time display for presenting the flare/relief valve performance indicators. For example, the dashboard 1200 can display results compared with a threshold, capacity, and strength indicator.

In some implementations, method 1400 can include interactions within the equipment and piping that form part of one single process has significant impact on how concurrent releases from disparate equipment may occur during an emergency release. The system dynamics, hydraulics and interaction became evident when actual releases were monitored within the period of an emergency release. This dynamic shows that the prediction of release from a given equipment at any given time may be under or over predicted even if the overall release reaches a certain maximum value.

Although emergency events typically occur in a shorter durations of time (for example, hours), techniques of the present disclosure can be used to handle short bursts of releases that are detected. In most cases, meters without validation are unreliable sources of information in an emergency. A lack of validation steps can result in spurious events that can taint the performance prediction based on history of releases during an actual emergency release.

In some implementations, method 1400 can include identifying outdated engineering information. For example, changes in a chemical plant that are not reflected in distributed control systems, piping and instrumented drawings or flare schematics can be flagged. This can be accomplished because the system can generate correlations between basic process control systems (control valves) and passive protection system (relief valves).

Predictive monitoring can be used to alert plants of breaches of the protection layer, allowing weak element to be pinpointed. Moreover, systems with near protection capacity or over capacity can aid in decisions with future upgrades (for example, to increase plant throughput).

Figure 15:
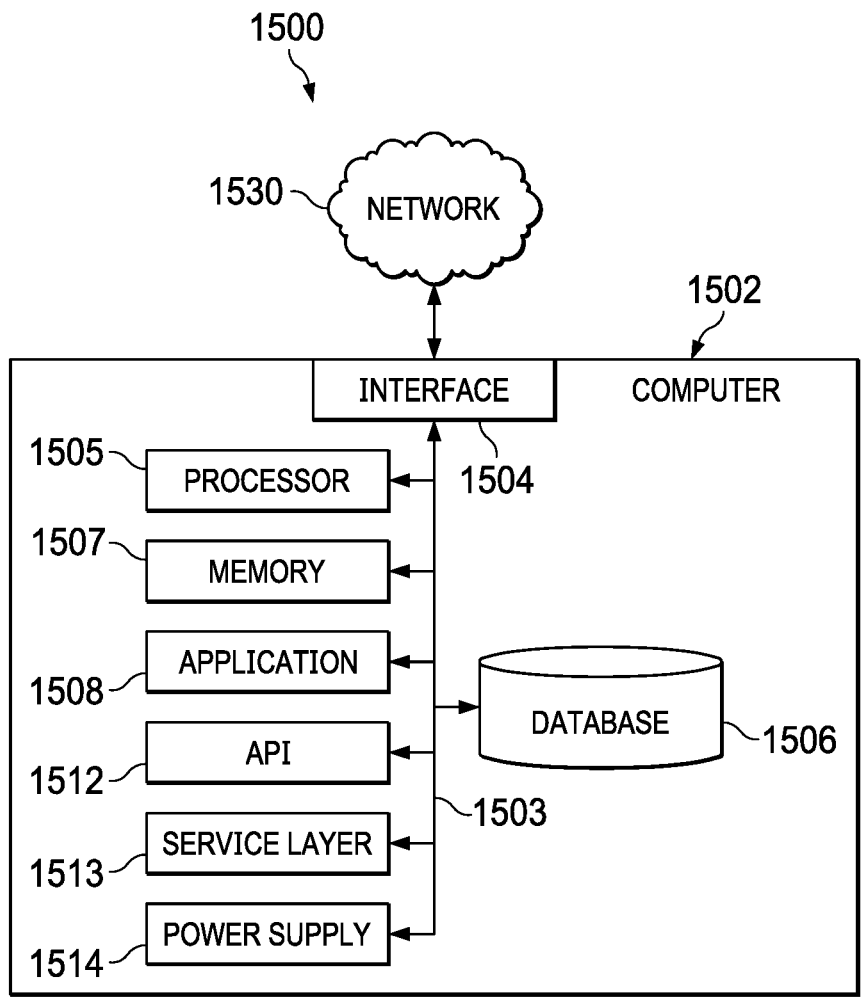
FIG. 15 is a block diagram illustrating an example computer system used to provide computational functionalities associated with described algorithms, methods, functions, processes, flows, and procedures as described in the present disclosure, according to some implementations of the present disclosure.

FIG. 15 is a block diagram of an example computer system 1500 used to provide computational functionalities associated with described algorithms, methods, functions, processes, flows, and procedures described in the present disclosure, according to some implementations of the present disclosure. The illustrated computer 1502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1502 can include input devices such as keypads, keyboards, and touch screens that can accept user information. Also, the computer 1502 can include output devices that can convey information associated with the operation of the computer 1502. The information can include digital data, visual data, audio information, or a combination of information. The information can be presented in a graphical user interface (UI) (or GUI).

The computer 1502 can serve in a role as a client, a network component, a server, a database, a persistency, or components of a computer system for performing the subject matter described in the present disclosure. The illustrated computer 1502 is communicably coupled with a network 1530. In some implementations, one or more components of the computer 1502 can be configured to operate within different environments, including cloud-computing-based environments, local environments, global environments, and combinations of environments.

At a top level, the computer 1502 is an electronic computing device operable to receive, transmit, process, store, and manage data and information associated with the described subject matter. According to some implementations, the computer 1502 can also include, or be communicably coupled with, an application server, an email server, a web server, a caching server, a streaming data server, or a combination of servers.

The computer 1502 can receive requests over network 1530 from a client application (for example, executing on another computer 1502). The computer 1502 can respond to the received requests by processing the received requests using software applications. Requests can also be sent to the computer 1502 from internal users (for example, from a command console), external (or third) parties, automated applications, entities, individuals, systems, and computers.

Each of the components of the computer 1502 can communicate using a system bus 1503. In some implementations, any or all of the components of the computer 1502, including hardware or software components, can interface with each other or the interface 1504 (or a combination of both) over the system bus 1503. Interfaces can use an application programming interface (API) 1512, a service layer 1513, or a combination of the API 1512 and service layer 1513. The API 1512 can include specifications for routines, data structures, and object classes. The API 1512 can be either computer-language independent or dependent. The API 1512 can refer to a complete interface, a single function, or a set of APIs.

The service layer 1513 can provide software services to the computer 1502 and other components (whether illustrated or not) that are communicably coupled to the computer 1502. The functionality of the computer 1502 can be accessible for all service consumers using this service layer. Software services, such as those provided by the service layer 1513, can provide reusable, defined functionalities through a defined interface. For example, the interface can be software written in JAVA, C++, or a language providing data in extensible markup language (XML) format. While illustrated as an integrated component of the computer 1502, in alternative implementations, the API 1512 or the service layer 1513 can be stand-alone components in relation to other components of the computer 1502 and other components communicably coupled to the computer 1502. Moreover, any or all parts of the API 1512 or the service layer 1513 can be implemented as child or sub-modules of another software module, enterprise application, or hardware module without departing from the scope of the present disclosure.

The computer 1502 includes an interface 1504. Although illustrated as a single interface 1504 in FIG. 15, two or more interfaces 1504 can be used according to particular needs, desires, or particular implementations of the computer 1502 and the described functionality. The interface 1504 can be used by the computer 1502 for communicating with other systems that are connected to the network 1530 (whether illustrated or not) in a distributed environment. Generally, the interface 1504 can include, or be implemented using, logic encoded in software or hardware (or a combination of software and hardware) operable to communicate with the network 1530. More specifically, the interface 1504 can include software supporting one or more communication protocols associated with communications. As such, the network 1530 or the interface's hardware can be operable to communicate physical signals within and outside of the illustrated computer 1502.

The computer 1502 includes a processor 1505. Although illustrated as a single processor 1505 in FIG. 15, two or more processors 1505 can be used according to particular needs, desires, or particular implementations of the computer 1502 and the described functionality. Generally, the processor 1505 can execute instructions and can manipulate data to perform the operations of the computer 1502, including operations using algorithms, methods, functions, processes, flows, and procedures as described in the present disclosure.

The computer 1502 also includes a database 1506 that can hold data for the computer 1502 and other components connected to the network 1530 (whether illustrated or not). For example, database 1506 can be an in-memory, conventional, or a database storing data consistent with the present disclosure. In some implementations, database 1506 can be a combination of two or more different database types (for example, hybrid in-memory and conventional databases) according to particular needs, desires, or particular implementations of the computer 1502 and the described functionality. Although illustrated as a single database 1506 in FIG. 15, two or more databases (of the same, different, or combination of types) can be used according to particular needs, desires, or particular implementations of the computer 1502 and the described functionality. While database 1506 is illustrated as an internal component of the computer 1502, in alternative implementations, database 1506 can be external to the computer 1502.

The computer 1502 also includes a memory 1507 that can hold data for the computer 1502 or a combination of components connected to the network 1530 (whether illustrated or not). Memory 1507 can store any data consistent with the present disclosure. In some implementations, memory 1507 can be a combination of two or more different types of memory (for example, a combination of semiconductor and magnetic storage) according to particular needs, desires, or particular implementations of the computer 1502 and the described functionality. Although illustrated as a single memory 1507 in FIG. 15, two or more memories 1507 (of the same, different, or combination of types) can be used according to particular needs, desires, or particular implementations of the computer 1502 and the described functionality. While memory 1507 is illustrated as an internal component of the computer 1502, in alternative implementations, memory 1507 can be external to the computer 1502.

The application 1508 can be an algorithmic software engine providing functionality according to particular needs, desires, or particular implementations of the computer 1502 and the described functionality. For example, application 1508 can serve as one or more components, modules, or applications. Further, although illustrated as a single application 1508, the application 1508 can be implemented as multiple applications 1508 on the computer 1502. In addition, although illustrated as internal to the computer 1502, in alternative implementations, the application 1508 can be external to the computer 1502.

The computer 1502 can also include a power supply 1514. The power supply 1514 can include a rechargeable or non-rechargeable battery that can be configured to be either user- or non-user-replaceable. In some implementations, the power supply 1514 can include power-conversion and management circuits, including recharging, standby, and power management functionalities. In some implementations, the power-supply 1514 can include a power plug to allow the computer 1502 to be plugged into a wall socket or a power source to, for example, power the computer 1502 or recharge a rechargeable battery.

There can be any number of computers 1502 associated with, or external to, a computer system containing computer 1502, with each computer 1502 communicating over network 1530. Further, the terms "client," "user," and other appropriate terminology can be used interchangeably, as appropriate, without departing from the scope of the present disclosure. Moreover, the present disclosure contemplates that many users can use one computer 1502 and one user can use multiple computers 1502.

Described implementations of the subject matter can include one or more features, alone or in combination.

For example, in a first implementation, a computer-implemented method includes the following. Flare sources, performance limits, and relationships between control valves and relief valves are established. A flare simulator is generated using piping isometric drawings. An emergency event is monitored, and information for the emergency event is filtered based on a control valve limit breach. Event start and finish time periods are divided into cases representing smaller time frames. Source max loads are determined for each case, and each case is run through the flare simulator. Flare/relief valve performance indicators are determined based on the source max loads after running each case.

The foregoing and other described implementations can each, optionally, include one or more of the following features:

A first feature, combinable with any of the following features, where establishing the flare sources is based on one or more of piping and instrument drawings, process flow diagrams, and instrument specification sheets.

A second feature, combinable with any of the previous or following features, where the monitoring and filtering use a process data historian.

A third feature, combinable with any of the previous or following features, where determining the source max loads for each case includes use a calculate control valve flow and transfer values in related relief valves.

A fourth feature, combinable with any of the previous or following features, where the flare/relief valve performance indicators include notifications, key process indicator (KPI) reports, and event logs.

A fifth feature, combinable with any of the previous or following features, the method further including creating a real-time display for presenting the flare/relief valve performance indicators.

A sixth feature, combinable with any of the previous or following features, the method further including detecting the emergency event based on deviations of a source from preset limits.

In a second implementation, a non-transitory, computer-readable medium stores one or more instructions executable by a computer system to perform operations including the following. Flare sources, performance limits, and relationships between control valves and relief valves are established. A flare simulator is generated using piping isometric drawings. An emergency event is monitored, and information for the emergency event is filtered based on a control valve limit breach. Event start and finish time periods are divided into cases representing smaller time frames. Source max loads are determined for each case, and each case is run through the flare simulator. Flare/relief valve performance indicators are determined based on the source max loads after running each case.

The foregoing and other described implementations can each, optionally, include one or more of the following features:

A first feature, combinable with any of the following features, where establishing the flare sources is based on one or more of piping and instrument drawings, process flow diagrams, and instrument specification sheets.

A second feature, combinable with any of the previous or following features, where the monitoring and filtering use a process data historian.

A third feature, combinable with any of the previous or following features, where determining the source max loads for each case includes use a calculate control valve flow and transfer values in related relief valves.

A fourth feature, combinable with any of the previous or following features, where the flare/relief valve performance indicators include notifications, key process indicator (KPI) reports, and event logs.

A fifth feature, combinable with any of the previous or following features, the operations further including creating a real-time display for presenting the flare/relief valve performance indicators.

A sixth feature, combinable with any of the previous or following features, the operations further including detecting the emergency event based on deviations of a source from preset limits.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Flare sources, performance limits, and relationships between control valves and relief valves are established. A flare simulator is generated using piping isometric drawings. An emergency event is monitored, and information for the emergency event is filtered based on a control valve limit breach. Event start and finish time periods are divided into cases representing smaller time frames. Source max loads are determined for each case, and each case is run through the flare simulator. Flare/relief valve performance indicators are determined based on the source max loads after running each case.

The foregoing and other described implementations can each, optionally, include one or more of the following features:

A first feature, combinable with any of the following features, where establishing the flare sources is based on one or more of piping and instrument drawings, process flow diagrams, and instrument specification sheets.

A second feature, combinable with any of the previous or following features, where the monitoring and filtering use a process data historian.

A third feature, combinable with any of the previous or following features, where determining the source max loads for each case includes use a calculate control valve flow and transfer values in related relief valves.

A fourth feature, combinable with any of the previous or following features, where the flare/relief valve performance indicators include notifications, key process indicator (KPI) reports, and event logs.

A fifth feature, combinable with any of the previous or following features, the operations further including creating a real-time display for presenting the flare/relief valve performance indicators.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method for monitoring petroleum facilities, the method comprising:
    establishing flare sources, performance limits, and relationships between control valves and relief valves of the flare sources;
    generating a flare simulator of the flare sources using piping isometric drawings, wherein the flare simulator comprises a hydraulic model that uses a network model comprising the control valves, the relief valves, and piping extracted from the piping isometric drawings;
    monitoring an emergency event and filtering information for the emergency event based on a control valve limit breach;
    dividing start and finish time periods of the emergency event into a plurality of cases representing smaller time frames within the emergency event, wherein each of the plurality of cases represents a sub-part of the emergency event;
    determining source max loads for each case in the plurality of cases, and running each case through the flare simulator; and
    determining, based on the source max loads and the running of each case through the flare simulator, performance indicators of the relief valves and of a flare during the emergency event.

2. The computer-implemented method of claim 1, wherein establishing the flare sources is based on one or more of piping and instrument drawings, process flow diagrams, and instrument specification sheets.

3. The computer-implemented method of claim 1, wherein the monitoring and filtering use a process data historian.

4. The computer-implemented method of claim 1, wherein determining the source max loads for each case includes use a calculate control valve flow and transfer values in related relief valves.

5. The computer-implemented method of claim 1, wherein the performance indicators of the relief valves and of a flare during the emergency event include notifications, key process indicator (KPI) reports, and event logs.

6. The computer-implemented method of claim 1, further comprising creating a real-time display for presenting the performance indicators of the relief valves and of a flare during the emergency event.

7. The computer-implemented method of claim 1, further comprising detecting the emergency event based on deviations of a source from preset limits.

8. A non-transitory, computer-readable medium storing one or more instructions executable by a computer system to perform operations for monitoring petroleum facilities, the operations comprising:
    establishing flare sources, performance limits, and relationships between control valves and relief valves of the flare sources;
    generating a flare simulator of the flare sources using piping isometric drawings, wherein the flare simulator comprises a hydraulic model that uses a network model comprising the control valves, the relief valves, and piping extracted from the piping isometric drawings;
    monitoring an emergency event and filtering information for the emergency event based on a control valve limit breach;
    dividing start and finish time periods of the emergency event into a plurality of cases representing smaller time frames within the emergency event, wherein each of the plurality of cases represents a sub-part of the emergency event;
    determining source max loads for each case in the plurality of cases, and running each case through the flare simulator; and
    determining, based on the source max loads and the running of each case through the flare simulator, performance indicators of the relief valves and of a flare during the emergency event.

9. The non-transitory, computer-readable medium of claim 8, wherein establishing the flare sources is based on one or more of piping and instrument drawings, process flow diagrams, and instrument specification sheets.

10. The non-transitory, computer-readable medium of claim 8, wherein the monitoring and filtering use a process data historian.

11. The non-transitory, computer-readable medium of claim 8, wherein determining the source max loads for each case includes use a calculate control valve flow and transfer values in related relief valves.

12. The non-transitory, computer-readable medium of claim 8, wherein the performance indicators of the relief valves and of a flare during the emergency event include notifications, key process indicator (KPI) reports, and event logs.

13. The non-transitory, computer-readable medium of claim 8, the operations further comprising creating a real-time display for presenting the performance indicators of the relief valves and of a flare during the emergency event.

14. The non-transitory, computer-readable medium of claim 8, the operations further comprising detecting the emergency event based on deviations of a source from preset limits.

15. A computer-implemented system, comprising:
    one or more processors; and
    a non-transitory computer-readable storage medium coupled to the one or more processors and storing programming instructions for execution by the one or more processors, the programming instructions instructing the one or more processors to perform operations for monitoring petroleum facilities, the operations comprising:
        establishing flare sources, performance limits, and relationships between control valves and relief valves of the flare sources;

generating a flare simulator of the flare sources using piping isometric drawings, wherein the flare simulator comprises a hydraulic model that uses a network model comprising the control valves, the relief valves, and piping extracted from the piping isometric drawings;

monitoring an emergency event and filtering information for the emergency event based on a control valve limit breach;

dividing start and finish time periods of the emergency event into a plurality of cases representing smaller time frames within the emergency event, wherein each of the plurality of cases represents a sub-part of the emergency event;

determining source max loads for each case in the plurality of cases, and running each case through the flare simulator; and determining, based on the source max loads and the running of each case through the flare simulator, performance indicators of the relief valves and of a flare during the emergency event.

16. The computer-implemented system of claim 15, wherein establishing the flare sources is based on one or more of piping and instrument drawings, process flow diagrams, and instrument specification sheets.

17. The computer-implemented system of claim 15, wherein the monitoring and filtering use a process data historian.

18. The computer-implemented system of claim 15, wherein determining the source max loads for each case includes use a calculate control valve flow and transfer values in related relief valves.

19. The computer-implemented system of claim 15, wherein the performance indicators of the relief valves and of a flare during the emergency event include notifications, key process indicator (KPI) reports, and event logs.

20. The computer-implemented system of claim 15, the operations further comprising creating a real-time display for presenting the performance indicators of the relief valves and of a flare during the emergency event.

* * * * *